United States Patent [19]

Bellavance et al.

[11] Patent Number: 4,636,978
[45] Date of Patent: Jan. 13, 1987

[54] PROGRAMMABLE STATUS REGISTER ARRANGEMENT

[75] Inventors: Joseph T. Bellavance; William J. Price, both of San Jose, Calif.

[73] Assignee: Signetics Corporation, Sunnyvale, Calif.

[21] Appl. No.: 620,197

[22] Filed: Jun. 13, 1984

[51] Int. Cl.⁴ .......................... G06F 9/02; G11C 5/06
[52] U.S. Cl. .................................... 364/900; 307/465
[58] Field of Search .................. 307/465 (U.S. only); 364/716, 200 MS File, 900 MS File; 377/64 (U.S. only)

[56] References Cited

U.S. PATENT DOCUMENTS

| | | | |
|---|---|---|---|
| 4,034,349 | 7/1977 | Monaco et al. | 364/200 |
| 4,124,899 | 11/1978 | Birkner et al. | 364/716 |
| 4,209,839 | 6/1980 | Bederman | 364/200 |
| 4,493,052 | 1/1985 | Geiger et al. | 364/900 |
| 4,546,444 | 10/1985 | Bullis | 364/550 |

Primary Examiner—James D. Thomas
Assistant Examiner—Lawrence E. Anderson
Attorney, Agent, or Firm—Robert T. Mayer

[57] ABSTRACT

A programmable status register arrangement which enables the status of a plurality of status registers in a system to be checked simultaneously including fusible links connected to the outputs of the status registers whereby a user of the arrangement can program it to control the transmission of status signals by the plurality of status registers.

7 Claims, 3 Drawing Figures

PROGRAMMABLE STATUS REGISTER ARRANGEMENT

This is an invention in circuitry. More particularly it involves a programmable arrangement useful with a plurality of status registers on integrated circuit devices.

It is conventional in microprocessor control systems to provide a plurality of input-output ports for use in connecting the system to external apparatus. Each such port usually has a data register associated with it. The data register for an input port, for example, receives and temporarily stores information from its associated external apparatus. This information is ultimately transmitted to the microprocessor when it addresses the data register.

Sometimes a status register is provided in association with a data register. A status register for the data register of an input port typically is a two state device. In its first state it stores a signal indicating that its associated data register has received information which has not yet been transmitted to the microprocessor. In its second state the status register stores a signal indicating that its associated data register has not received any such information.

In a microprocessor control system the microprocessor checks the condition of its associated status registers on a regular basis. In the past it was conventional to check the condition of each status register one at a time serially. It is an object of this invention to enable a microprocessor to check the condition of each of a plurality of status registers in a system simultaneously.

It is a feature of the invention to provide a plurality of output circuits for each status register with each output circuit having a programming means in its conducting path.

One of the advantages of the invention is that it reduces the time needed to check the status registers in a system.

In accordance with the invention there is provided a status register arrangement which includes a bus having a plurality of conductors. A plurality of status registers each generating status signals and each having a plurality of output circuits each connected to carry its associated register's status signals are also included in the arrangement. Programming means are provided for selectively connecting at least one output circuit of each status register to one of the bus conductors. Each output circuit so connected is connected to a different one of the conductors. In this way the bus can conduct signals indicating the status of a plurality of status registers simultaneously.

Other objects, features and advantages of the invention will be apparent from the following description and appended claims when considered in conjunction with the accompanying drawing in which:

Figure 1:
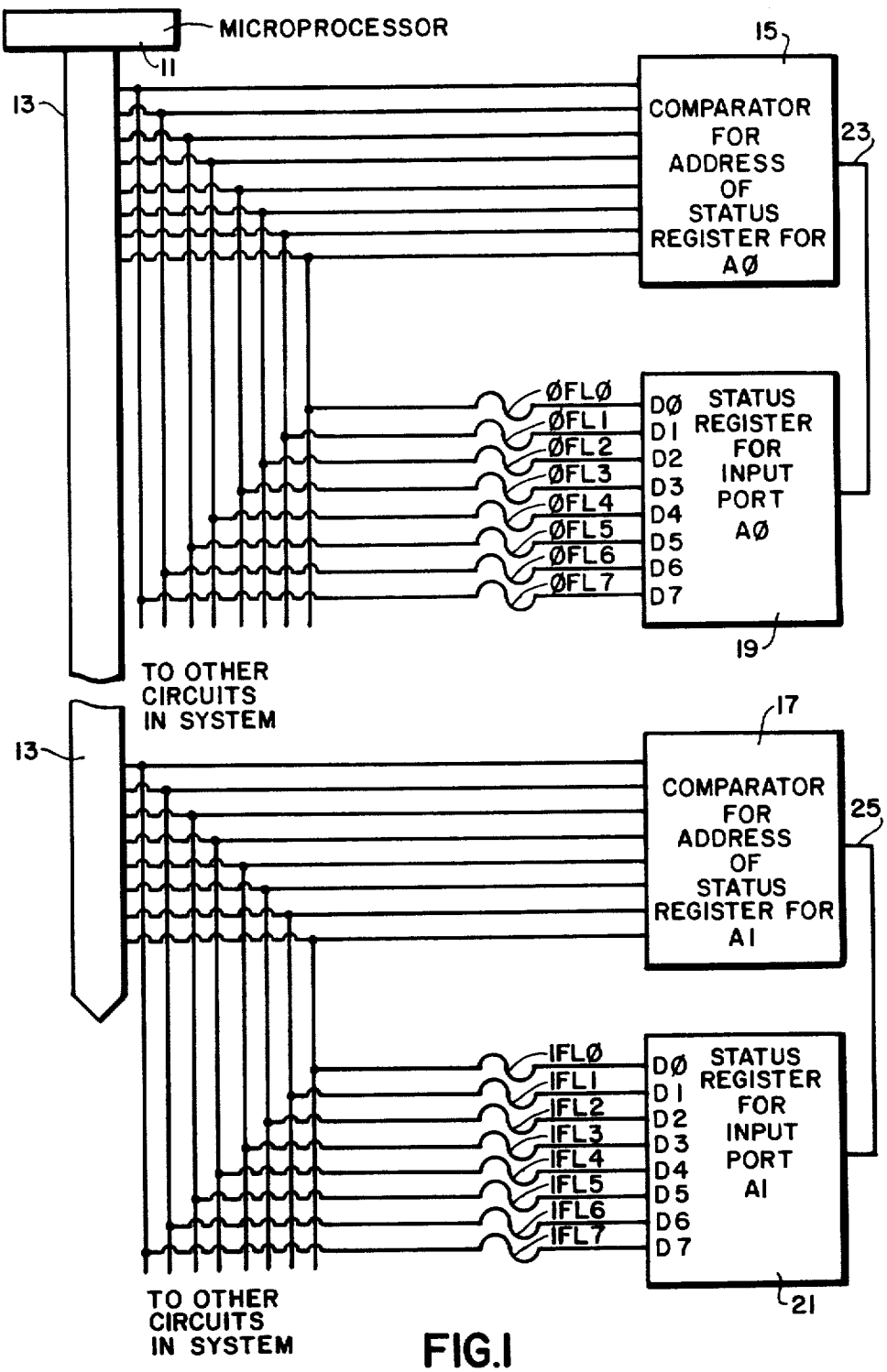
FIG. 1 is a simplified schematic of a control system employing the invention.

Shown in FIG. 1 is part of the circuits contained in a control system including microprocessor 11. Microprocessor 11 is connected by bus 13 to various circuits in the system. Included among these circuits are comparators and status registers for input ports A0 through A7. For simplification purposes only those comparators 15 and 17 and those status registers 19 and 21 for input ports A0 and A1 are shown. The comparators and status registers for ports A2 through A7 are similar to those for ports A0 and A1.

As can be seen bus 13 includes eight conductors for connection to various circuits in the system including comparators 15 and 17 and status registers 19 and 21. Bus 13 is similarly connected to the comparators and status registers for port A2 through A7. In the presently preferred embodiment bus 13 is also connected to the data registers (not shown) associated with the eight status registers for ports A0 through A7.

Each of the status registers generates status signals and includes output circuits D0 through D7 for each of the conductor paths of bus 13. Each of these output circuits is connected to carry its associated register's status signals and is also connected to its associated conductor path through a fusible link. These fusible links or fuses are identified for input port A0 as 0FL0 through 0FL7 and for port A1 as 1FL0 through 1FL7.

Figure 2:
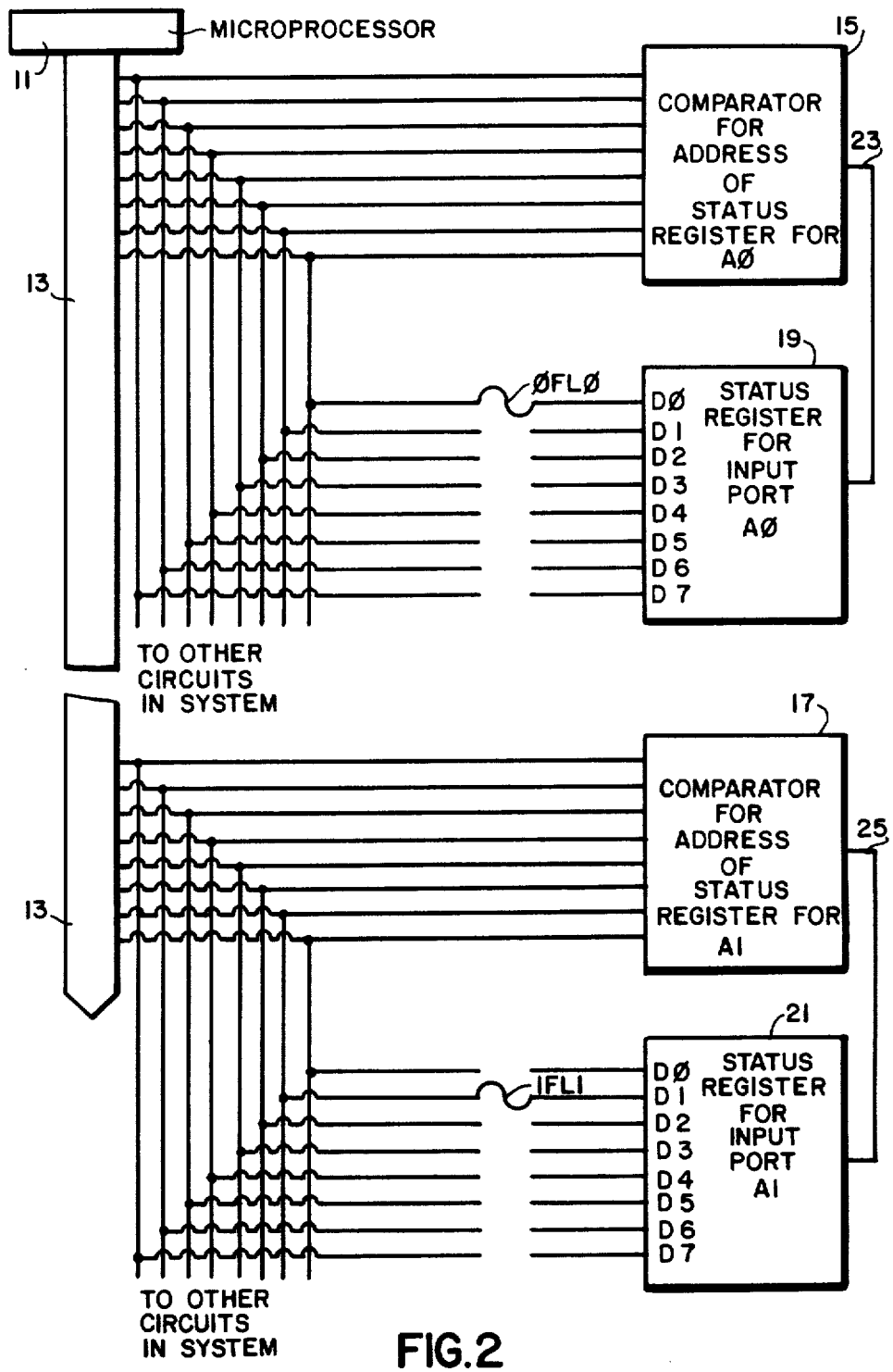
FIG. 2 is an altered version of FIG. 1.

Fusible links are used in the presently preferred embodiment of the invention. They provide programming means for users of the invention. For illustrative purposes FIG. 2 shows that all of the fusible links for the status register of input port A0 have been blown except fusible link 0FL0. Similarly, all of the fusible links for the status register of input port A1 have been blown except for fusible link 1FL1. The fuses, composed of nickel-chromium material, are blown in any well-known manner. Similarly each of the status registers for input ports A2 through A7 may have all of their fuses blown except for an individual one which would be different for each of the input ports.

With this arrangement, microprocessor 11 can check the condition of each of the status registers for ports A0 through A7 simultaneously along bus 13. In operation microprocessor 11 sends out a status register address along bus 13. This is received by the comparator associated with each status register. Since each status register for ports A0 through A7 are to transmit their status signals simultaneously a common address is used for all status registers. The comparators in recognition of the common address send enable signals along output lines, such as 23 and 25, to their associated status registers. Each of them is thereby enabled to send its status signal along its associated conductor of bus 13 at the appropriate time.

In the preferred embodiment the status register address is programmable by using fuses to set the status register address in the comparators. By selecting different addresses for different groups of status registers, a user has a certain amount of flexibility in arranging the groupings in which the status registers of a system will be checked for status by their microprocessor. Those skilled in the art will understand that the status register address could also be hand-wired. In that case, however, the system would not be as user programmable as the preferred embodiment.

Figure 3:
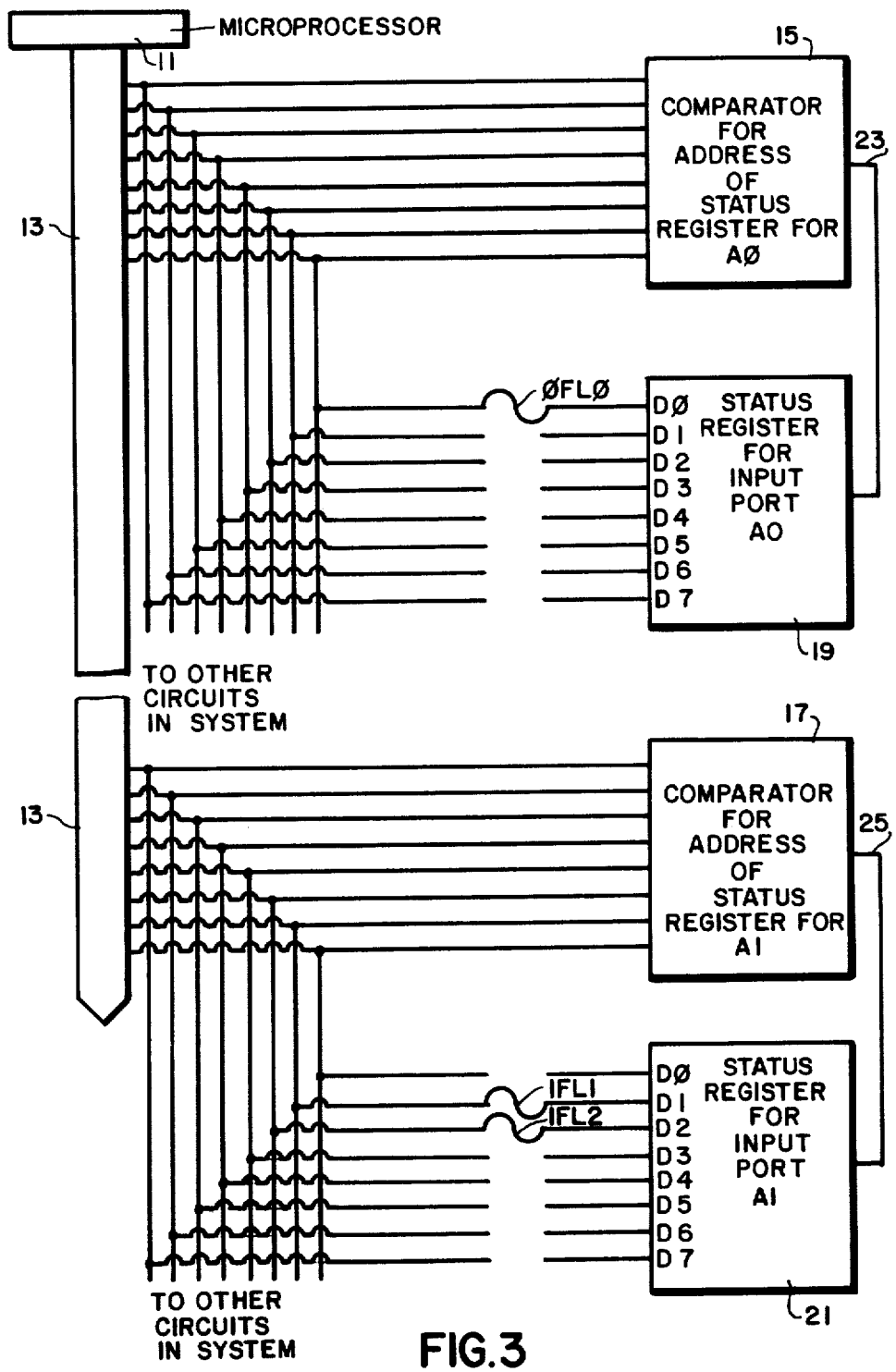
FIG. 3 is another altered version of FIG. 1.

In an alternative arrangement, more than one of the fusible links FL0–FL7 for one or more of the status registers could be left intact such as that shown for the status register of input port A1 in FIG. 3. In this alternative of the invention both fuses 1FL1 and 1FL2 are left intact. Obviously, in this arrangement there would be less status registers in the group than there are conductor paths in bus 13. By leaving more than one fusible link intact for the status register for port A1 that register is capable of transmitting its status signal along more than one conductor path. In this way microprocessor 11 could separate the status registers connected to bus 13 into sub-groups by including the register for port A1 and one or more of the other registers into such a sub-group, as desired.

It is apparent that various modifications of the above will be evident to those skilled in the art and that the arrangement described herein is for illustrative purposes and is not to be considered restrictive.

What is claimed is:

1. A status register arrangement including a bus having a plurality of conductors, a plurality of status registers each generating status signals and each having a plurality of output circuit means for carrying their associated register's status signals and programming means for connecting at least certain of said output circuit means of each status register to said conductors, said programming means comprising fusible link means connected between each said certain output circuit means of each status register and an associated and separate conductor for programming said status register arrangement by destroying selected ones of said fusible link means and leaving selected ones of said certain output circuit means of different status registers connected to different conductors such that a plurality of said status registers can transmit their status signals simultaneously on said bus on different conductors.

2. A status register arrangement as in claim 1, wherein said plurality of status registers equals in number the plurality of conductors in said bus.

3. A status register arrangement as in claim 1, wherein said plurality of status registers is less in number then the plurality of conductors in said bus.

4. A status register arrangement as in claim 3, wherein said programmable means connects more than one output circuit of at least one status register to said conductors whereby said one status register may transmit signals simultaneously along more than one conductor.

5. A status register arrangement as in any one of claims 1 through 4, wherein each said status register signal can be transmitted simultaneously on said conductors.

6. A status register arrangement as in claim 5, wherein each status register has an address and wherein the address of each of said plurality of status registers is the same.

7. A status register arrangement as in any one of claims 1 through 4, wherein said programming means are nickel-chromium fuses connected to each output circuit means of each status register.

* * * * *